US012521196B2

(12) United States Patent
Kitatsuji et al.

(10) Patent No.: US 12,521,196 B2
(45) Date of Patent: Jan. 13, 2026

(54) SURGICAL ROBOT AND METHOD FOR SETTING PIVOT POSITION

(71) Applicant: KAWASAKI JUKOGYO KABUSHIKI KAISHA, Kobe (JP)

(72) Inventors: Hiroaki Kitatsuji, Kobe (JP); Tsuyoshi Tojo, Kobe (JP); Yusuke Tanigake, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 808 days.

(21) Appl. No.: 17/239,721

(22) Filed: Apr. 26, 2021

(65) Prior Publication Data

US 2021/0330409 A1 Oct. 28, 2021

(30) Foreign Application Priority Data

Apr. 28, 2020 (JP) ................. 2020-079005

(51) Int. Cl.
*A61B 34/00* (2016.01)
*A61B 34/30* (2016.01)

(52) U.S. Cl.
CPC .............. *A61B 34/70* (2016.02); *A61B 34/30* (2016.02); *A61B 2034/301* (2016.02); *A61B 2034/742* (2016.02)

(58) Field of Classification Search
CPC ......... A61B 34/00; A61B 34/20; A61B 34/25; A61B 34/30; A61B 34/37; A61B 34/70; A61B 34/74; A61B 2034/2046; A61B 2034/301; A61B 2034/742; A61B 2034/2059; A61B 2034/302; A61B 2034/305

USPC ........................................................ 700/245
See application file for complete search history.

(56) References Cited

U.S. PATENT DOCUMENTS

| | | | |
|---|---|---|---|
| 2014/0039517 A1* | 2/2014 | Bowling | B25J 9/161 606/130 |
| 2014/0194699 A1 | 7/2014 | Roh et al. | |
| 2014/0276952 A1* | 9/2014 | Hourtash | B25J 18/007 700/263 |
| 2016/0100898 A1* | 4/2016 | Jinno | A61B 34/37 606/130 |
| 2019/0000576 A1 | 1/2019 | Mintz et al. | |
| 2019/0217480 A1* | 7/2019 | Park | B25J 9/1628 |
| 2021/0330409 A1 | 10/2021 | Kitatsuji et al. | |
| 2022/0378518 A1* | 12/2022 | Kanazawa | A61B 34/30 |

FOREIGN PATENT DOCUMENTS

| | | |
|---|---|---|
| EP | 4101408 A1 | 12/2022 |
| JP | 2014-117783 A | 6/2014 |
| JP | 2016-516487 A | 6/2016 |
| JP | 2021-171457 A | 11/2021 |
| WO | 2014022786 A2 | 8/2013 |

* cited by examiner

*Primary Examiner* — Khoi H Tran
*Assistant Examiner* — Sarah A Tran
(74) *Attorney, Agent, or Firm* — METROLEX IP LAW GROUP, PLLC; Robert L. Scott, Esq.

(57) ABSTRACT

In a surgical robot, a pivot position teaching button is pressed with a tip end of a medical device moved to a position corresponding to an insertion position of a trocar inserted into a body surface of a patient such that a pivot position is stored in a storage.

24 Claims, 9 Drawing Sheets

SURGICAL ROBOT AND METHOD FOR SETTING PIVOT POSITION

CROSS-REFERENCE TO RELATED APPLICATION

The priority application number JP2020-079005, Surgical Robot and Method for Setting Pivot Position, Apr. 28, 2020, Hiroaki Kitatsuji, Tsuyoshi Tojo, and Yusuke Tanigake, upon which this patent application is based, is hereby incorporated by reference.

BACKGROUND OF THE INVENTION

Field of the Invention

The present disclosure relates to a surgical robot and a method for setting a pivot position, and more particularly, it relates to a surgical robot that moves medical devices attached to arms with pivot positions as fulcrums and a method for setting a pivot position.

Description of the Background Art

Conventionally, a surgical robot that moves medical devices attached to arms with pivot positions as fulcrums is known. Such a surgical robot is disclosed in Japanese Translation of PCT International Application Publication No 2016-516487, for example.

Japanese Translation of PCT International Application Publication No 2016-516487 discloses a robot manipulator assembly including a manipulator arm and a tool (such as a surgical instrument) attached to the manipulator arm. The manipulator arm is configured to translate or rotate the tool attached to the manipulator arm.

The manipulator arm disclosed in Japanese Translation of PCT International Application Publication No 2016-516487 includes an instrument holder configured to translate the tool along a longitudinal direction. In addition, a cannula is held as a distal member of the instrument holder. The tip end of the tool held by the instrument holder is inserted into the cannula. In the robot manipulator assembly disclosed in Japanese Translation of PCT International Application Publication No 2016-516487, a predetermined portion of the cannula is determined in advance as a pivot point. That is, in the robot manipulator assembly disclosed in Japanese Translation of PCT International Application Publication No 2016-516487, the pivot point is mechanically determined to be in a parallelogram arrangement with respect to the predetermined portion of the cannula held by the instrument holder. While the cannula held by the instrument holder is inserted into a patient, the tool is pivoted (rotated) with the pivot point as a fulcrum.

However, in the robot manipulator assembly as disclosed in Japanese Translation of PCT International Application Publication No 2016-516487, instrument holders of four robot manipulator assemblies hold four cannulas (trocars), respectively. Therefore, a space in the vicinity of the body surface of the patient into which the four cannulas (trocars) are inserted is narrowed by the four instrument holders and their cannula holding mechanisms. Thus, the degree of freedom of arrangement of the trocars to be inserted into the patient by an assistant doctor is disadvantageously reduced, and when the assistant doctor performs an assistive operation during an operation, mechanisms such as the instrument holder disadvantageously interfere with the assistive operation.

SUMMARY OF THE INVENTION

The present disclosure is intended to solve the above problems. The present disclosure aims to provide a surgical robot and a method for setting a pivot position (pivot point) that each facilitate an operation in the vicinity of the body surface of a patient with a plurality of trocars being arranged thereon as compared with a case in which the pivot point is mechanically determined.

In order to attain the aforementioned object, a surgical robot according to a first aspect of the present disclosure includes an arm having a tip end side to which a medical device is attached, an operation unit attached to the arm, the operation unit being configured to operate the arm, and a storage, the operation unit includes a pivot position teaching button configured to store in the storage a pivot position that serves as a fulcrum for movement of the medical device attached to the arm, and the pivot position teaching button is pressed with a tip end of the medical device attached to the tip end side of the arm moved to a position corresponding to an insertion position of a trocar inserted into a body surface of a patient by the operation unit such that the pivot position is stored in the storage.

In the surgical robot according to the first aspect of the present disclosure, as described above, the pivot position teaching button is pressed with the tip end of the medical device attached to the tip end side of the arm moved to the position corresponding to the insertion position of the trocar inserted into the body surface of the patient by the operation unit such that the pivot position is stored in the storage. Accordingly, the pivot position teaching button is pressed such that the pivot position is stored in the storage, and thus it is not necessary to arrange an instrument or the like that supports the trocar in order to store (set) the pivot position in the storage. Consequently, an operation in the vicinity of the body surface of the patient with a plurality of trocars being arranged thereon can be easily performed as compared with a case in which the pivot position is mechanically determined.

A method for setting a pivot position according to a second aspect of the present disclosure includes moving a tip end of a medical device attached to a tip end side of an arm to a position corresponding to an insertion position of a trocar inserted into a body surface of a patient by operating the arm, and storing in a storage the pivot position that serves as a fulcrum for movement of the medical device attached to the arm by pressing a pivot position teaching button with the tip end of the medical device moved to the position corresponding to the insertion position of the trocar.

As described above, the method for setting the pivot position according to the second aspect of the present disclosure includes the storing in the storage of the pivot position that serves as a fulcrum for movement of the medical device attached to the arm by pressing the pivot position teaching button with the tip end of the medical device moved to the position corresponding to the insertion position of the trocar. Accordingly, the pivot position teaching button is pressed such that the pivot position is stored, and thus it is not necessary to arrange an instrument or the like that supports the trocar in order to store (set) the pivot position. Consequently, it is possible to provide the method for setting the pivot position that facilitates an operation in the vicinity of the body surface of the patient with a plurality of trocars being arranged thereon as compared with a case in which the pivot position is mechanically determined.

A method for setting a pivot position according to a third aspect of the present disclosure includes moving a tip end of a medical device attached to a tip end side of an arm to a position at which an outer surface of a trocar inserted into a body surface of a patient and the body surface contact each other by operating the arm, and storing in a storage the pivot position that serves as a fulcrum for movement of the medical device attached to the arm by receiving an instruction to store the pivot position with the tip end of the medical device moved to the position at which the outer surface of the trocar inserted into the body surface of the patient and the body surface contact each other.

As described above, the method for setting the pivot position according to the third aspect of the present disclosure includes the storing in the storage of the pivot position that serves as a fulcrum for movement of the medical device attached to the arm by receiving the instruction to store the pivot position with the tip end of the medical device moved to the position at which the outer surface of the trocar inserted into the body surface of the patient and the body surface contact each other. Accordingly, the pivot position teaching button is pressed such that the pivot position is stored, and thus it is not necessary to arrange an instrument or the like that supports the trocar in order to store (set) the pivot position. Consequently, it is possible to provide the method for setting the pivot position that facilitates an operation in the vicinity of the body surface of the patient with a plurality of trocars being arranged thereon as compared with a case in which the pivot position is mechanically determined.

According to the present disclosure, as described above, the operation in the vicinity of the body surface of the patient with the plurality of trocars being arranged thereon can be easily performed as compared with a case in which the pivot position (pivot point) is mechanically determined.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
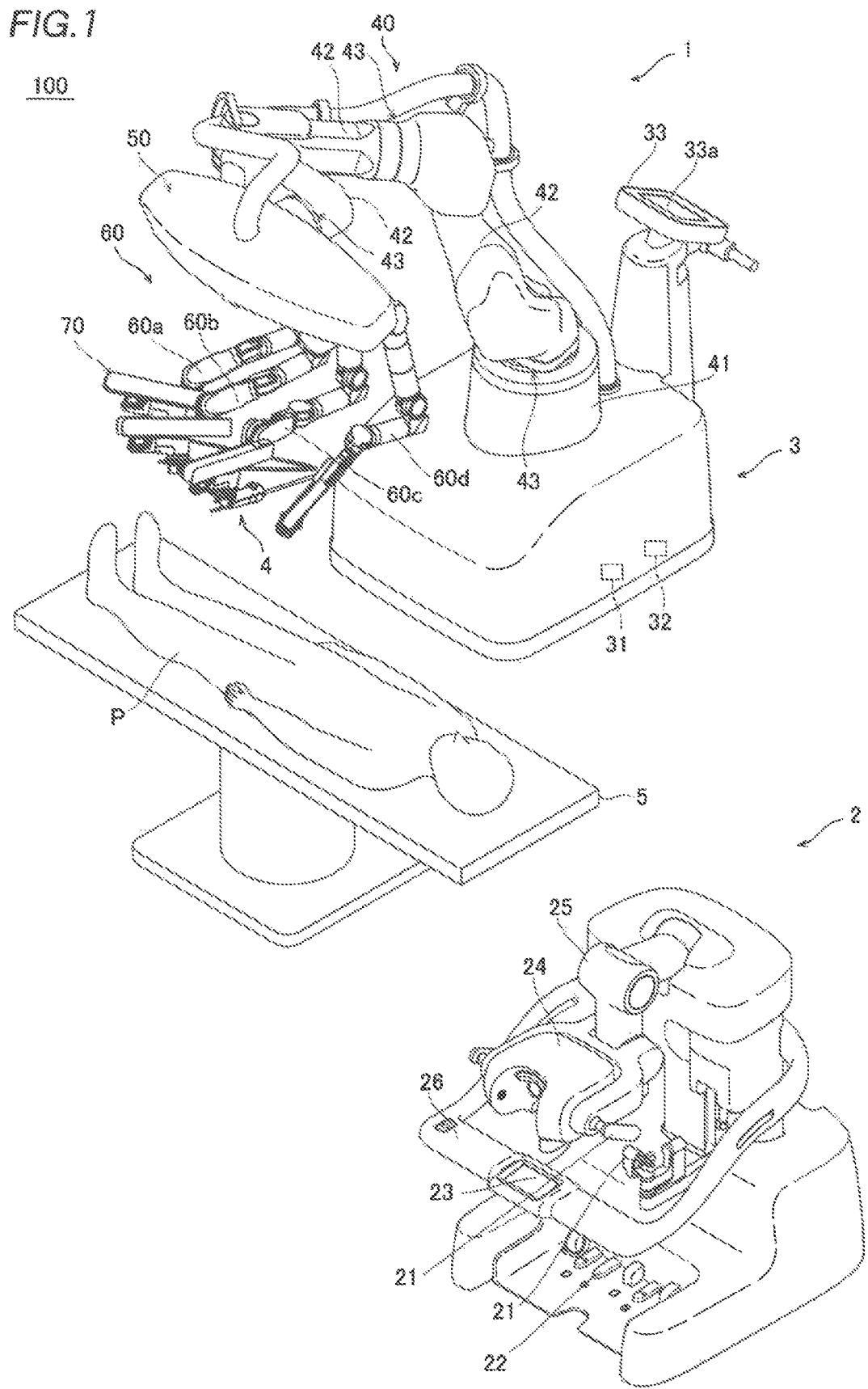
FIG. 1 is a diagram showing the configuration of a surgical system according to an embodiment of the present disclosure.

An embodiment of the present disclosure is hereinafter described with reference to the drawings.

The configuration of a surgical system 100 according to this embodiment is now described with reference to FIGS. 1 to 14. The surgical system 100 includes a medical manipulator 1 that is a patient P-side device and a remote operation device 2 that is an operator-side device configured to operate the medical manipulator 1. The medical manipulator 1 includes a medical cart 3, and is configured to be movable. The remote operation device 2 is spaced apart from the medical manipulator 1, and the medical manipulator 1 is configured to be remotely operated by the remote operation device 2. A surgeon inputs a command to the remote operation device 2 to cause the medical manipulator 1 to perform a desired operation. The remote operation device 2 transmits the input command to the medical manipulator 1. The medical manipulator 1 operates based on the received command. The medical manipulator 1 is arranged in an operating room that is a sterilized sterile field. The medical manipulator 1 is an example of a "surgical robot" in the claims.

The remote operation device 2 is arranged inside or outside the operating room, for example. The remote operation device 2 includes operation manipulator arms 21, operation pedals 22, a touch panel 23, a monitor 24, a support arm 25, and a support bar 26. The operation manipulator arms 21 define operation handles for the surgeon to input commands. The monitor 24 is a scope-type display that displays an image captured by an endoscope 6. The support arm 25 supports the monitor 24 so as to align the height of the monitor 24 with the height of the surgeon's face. The touch panel 23 is arranged on the support bar 26. The surgeon's head is detected by a sensor (not shown) provided in the vicinity of the monitor 24 such that the medical manipulator 1 can be operated by the remote operation device 2. The surgeon operates the operation manipulator arms 21 and the operation pedals 22 while visually recognizing an affected area on the monitor 24. Thus, a command is input to the remote operation device 2. The command input to the remote operation device 2 is transmitted to the medical manipulator 1.

The medical cart 3 includes a controller 31 that controls the operation of the medical manipulator 1 and a storage 32 that stores programs or the like to control the operation of the medical manipulator 1. The controller 31 of the medical cart 3 controls the operation of the medical manipulator 1 based on the command input to the remote operation device 2.

The medical cart 3 includes an input 33. The input 33 is configured to receive operations to move a positioner 40, an arm base 50, and a plurality of arms 60 or change their postures mainly in order to prepare for surgery before the surgery. The positioner 40 is an example of an "arm base mover" in the claims.

Figure 2:
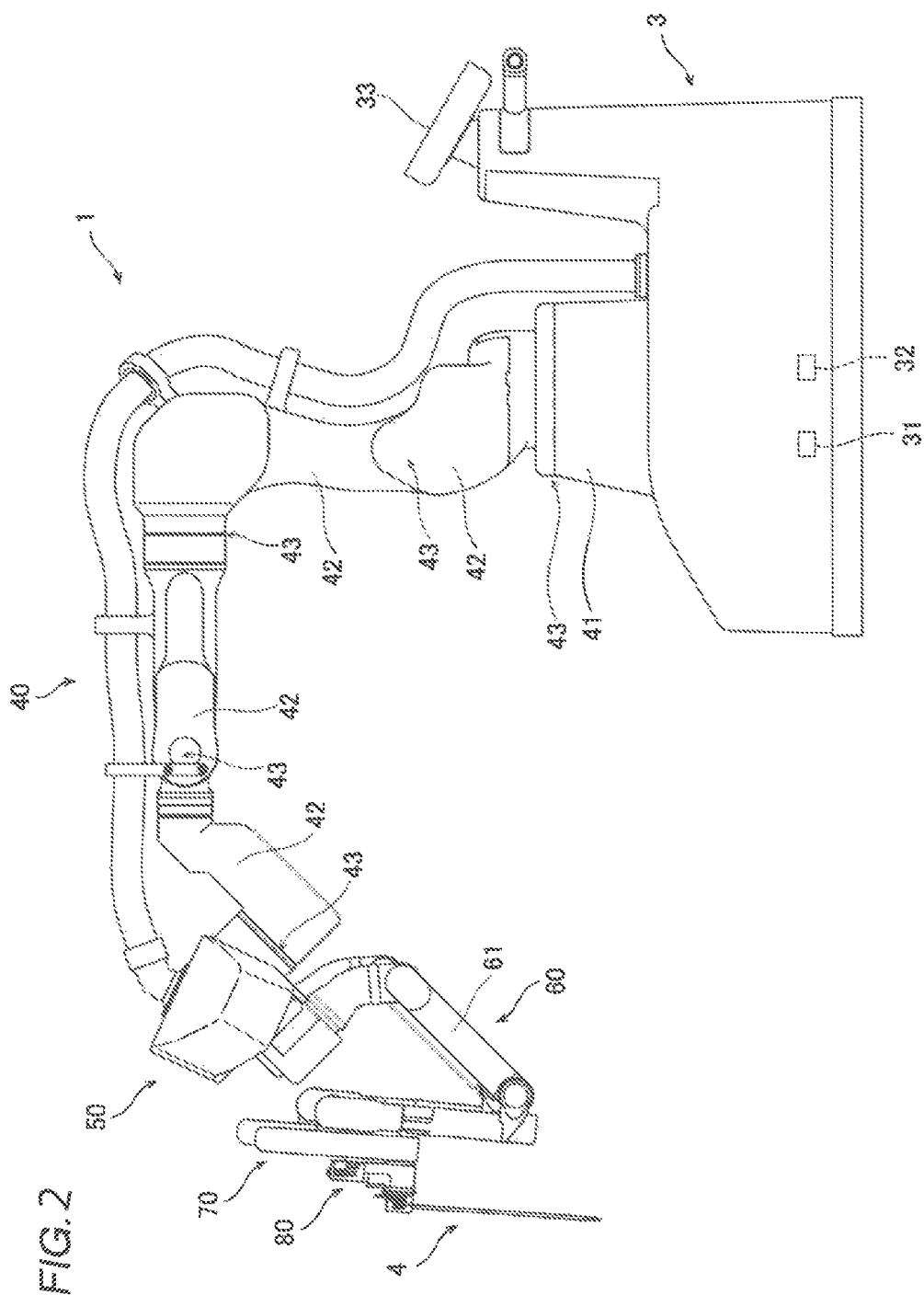
FIG. 2 is a diagram showing the configuration of a medical manipulator according to the embodiment of the present disclosure.

The medical manipulator 1 shown in FIGS. 1 and 2 is arranged in the operating room. The medical manipulator 1 includes the medical cart 3, the positioner 40, the arm base 50, and the plurality of arms 60. The arm base 50 is attached to the tip end of the positioner 40. The arm base 50 has a relatively long rod shape (long shape). The bases of the plurality of arms 60 are attached to the arm base 50. Each of the plurality of arms 60 is configured to be able to take a folded posture (stored posture). The arm base 50 and the plurality of arms 60 are covered with sterile drapes (not shown) and used.

The positioner 40 includes a 7-axis articulated robot, for example. The positioner 40 is arranged on the medical cart 3. The positioner 40 moves the arm base 50. Specifically, the positioner 40 is configured to move the position of the arm base 50 three-dimensionally.

The positioner 40 includes a base 41 and a plurality of links 42 coupled to the base 41. The plurality of links 42 are coupled to each other by joints 43.

As shown in FIG. 1, a medical device 4 is attached to the tip end of each of the plurality of arms 60. The medical device 4 includes a replaceable instrument or the endoscope 6 (see FIG. 7), for example.

Figure 3:
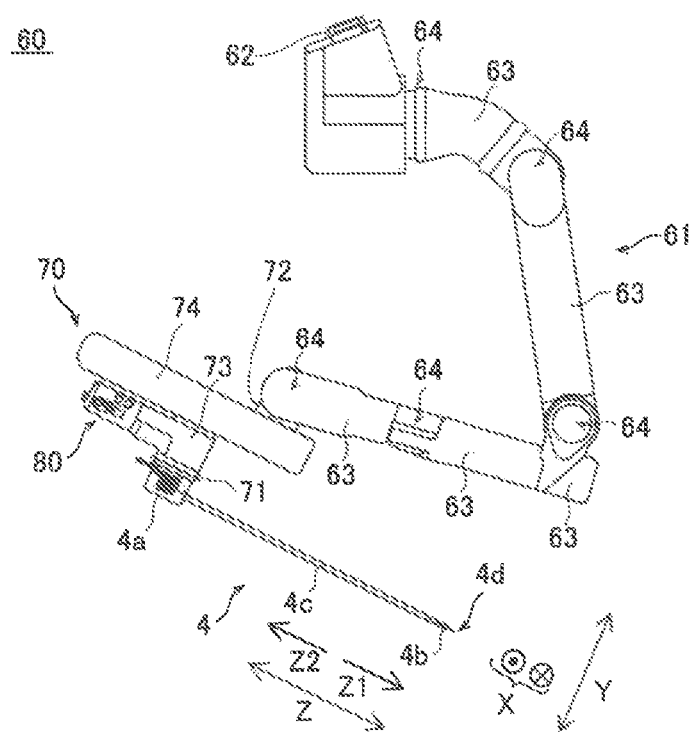
FIG. 3 is a diagram showing the configuration of an arm of the medical manipulator according to the embodiment of the present disclosure.

As shown in FIG. 3, the instrument as the medical device 4 includes a driven unit 4*a* driven by a servomotor M2 provided in a holder 71 of each of the arms 60. An end effector 4*b* is provided at the tip end of the instrument. The end effector 4*b* includes a pair of forceps, a pair of scissors, a grasper, a needle holder, a microdissector, a stable applier, a tacker, a suction cleaning tool, a snare wire, a clip applier, etc. as instruments having joints. The end effector 4*b* includes a cutting blade, a cautery probe, a washer, a catheter, a suction orifice, etc. as instruments having no joint. The medical device 4 includes a shaft 4*c* that connects the driven unit 4*a* to the end effector 4*b*. The driven unit 4*a*, the shaft 4*c*, and the end effector 4*b* are arranged along a Z direction.

The configuration of the arms 60 is now described in detail.

As shown in FIG. 3, each of the arms 60 includes an arm portion 61 (a base 62, links 63, and joints 64) and a translation mechanism 70 provided at the tip end of the arm portion 61. The arms 60 are configured to three-dimensionally move the tip end sides with respect to the base sides (arm base 50) of the arms 60. The plurality of arms 60 have the same configuration as each other.

The translation mechanism 10 is provided on the tip end side of the arm portion 61, and the medical device 4 is attached thereto. The translation mechanism 70 translates the medical device 4 in a direction in which the medical device 4 is inserted into the patient P. Furthermore, the translation mechanism 70 is configured to translate the medical device 4 relative to the arm portion 61. Specifically, the translation mechanism 70 includes the holder 71 that holds the medical device 4. The servomotor M2 (see FIG. 13) is housed in the holder 71. The servomotor M2 is configured to rotate a rotating body provided in the driven unit 4*a* of the medical device 4. The rotating body of the driven unit 4*a* is rotated such that the end effector 4*b* is operated.

The arms 60 are configured to be removable from the arm base 50. The arm portion 61 and the translation mechanism 70 do not include a mechanism or an instrument configured to hold a trocar T. Consequently, a space in the vicinity of the body surface S of the patient with a plurality of trocars T being arranged thereon is widened, and it becomes possible to easily perform an operation in the vicinity of the body surface S of the patient P with the plurality of trocars T being arranged thereon.

The arm portion 61 includes a 7-axis articulated robot arm. The arm portion 61 includes the base 62 configured to attach the arm portion 61 to the arm base 50, and a plurality of links 63 coupled to the base 62. The plurality of links 63 are coupled to each other by the joints 64.

The translation mechanism 70 is configured to translate the medical device 4 attached to the holder 71 along the Z direction (a direction in which the shaft 4*c* extends) by translating the holder 71 along the Z direction. Specifically, the translation mechanism 70 includes a base end side link 12 connected to the tip end of the arm portion 61, a tip end side link 73, and a coupling link 74 provided between the base end side link 72 and the tip end side link 73. The holder 71 is provided on the tip end side link 73.

The coupling link 74 of the translation mechanism 70 is configured as a double speed mechanism that moves the tip end side link 73 relative to the base end side link 72 along the Z direction. The tip end side link 73 is moved along the Z direction relative to the base end side link 72 such that the medical device 4 provided on the holder 71 is translated along the Z direction. The tip end of the arm portion 61 is connected to the base end side link 72 so as to rotate the base end side link 72 about a Y direction orthogonal to the Z direction.

Figure 4:
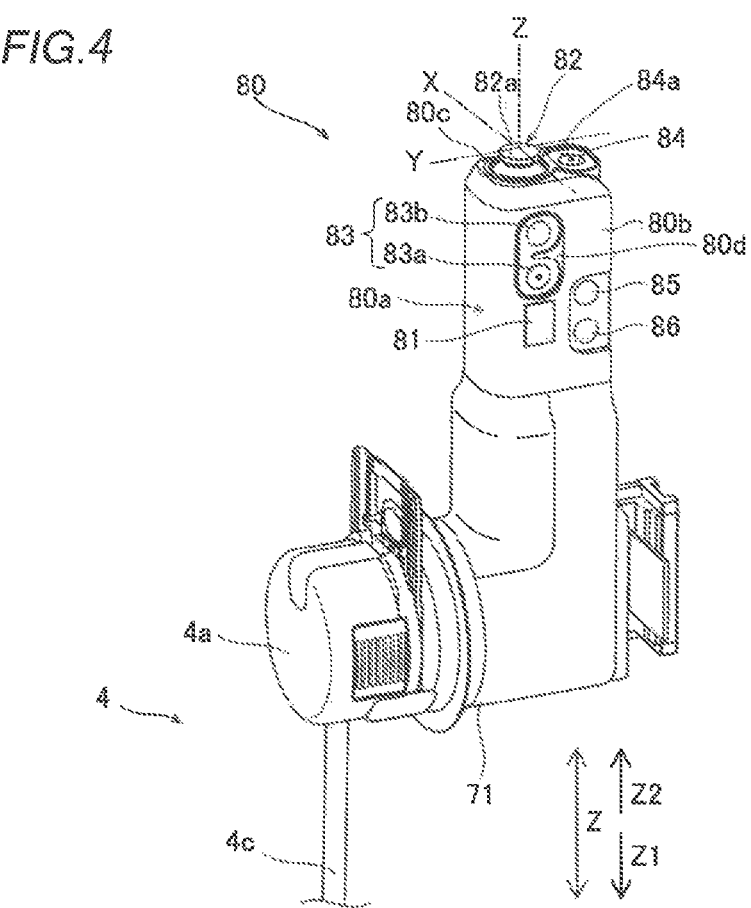
FIG. 4 is a perspective view showing the configuration of an operation unit of the medical manipulator according to the embodiment of the present disclosure.

As shown in FIG. 4, the medical manipulator 1 includes an operation unit 80 attached to each of the arms 60 to operate the arm 60. The operation unit 80 includes enable switches 81, a joystick 82, and switch units 83. The enable switches 81 allow or disallow movement of the arm 60 through the joystick 82 and the switch units 83. The enable switches 81 get into a state of allowing movement of the medical device 4 by the arm 60 when the operator (such as a nurse or an assistant) grasps and presses the operation unit 80.

Specifically, the enable switches 81 are push-button switches pressed by the operator's fingers. The enable switches 81 are pressed such that it becomes possible to perform a control to energize servomotors M1 to M3 (perform a control to drive the servomotors M1 to M3). That is, it becomes possible to perform a control to move the arm 60 only while the enable switches 81 are pressed.

Figure 6:
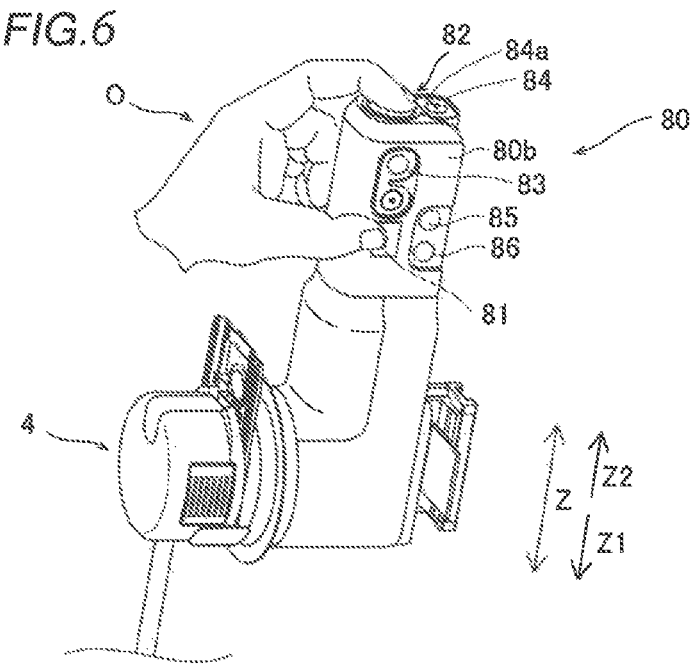
FIG. 6 is a diagram showing a state in which an operator grasps the operation unit of the medical manipulator according to the embodiment of the present disclosure.

As shown in FIG. 6, the operator tilts the joystick 82 with their finger such that the joystick 82 is operated. The arm 60 is controlled to be moved according to a direction in which the joystick 82 is tilted and an angle at which the joystick 82 is tilted. The operator brings their finger into contact with the tip end 82*a* of the joystick 82, moves their finger, and tilts the joystick 82 to operate the joystick 82. Only while the enable switches 81 are pressed, a signal input based on the operation of the joystick 82 is received. That is, when the enable switches 81 are not pressed, the arm 60 is not moved even when the joystick 82 is operated.

Figure 5:
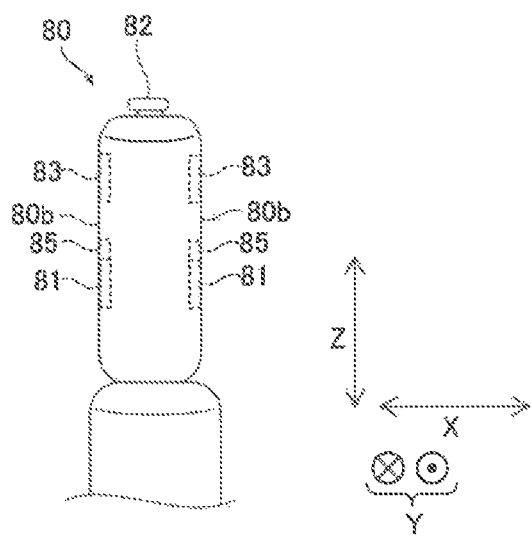
FIG. 5 is a side view showing the configuration of the operation unit of the medical manipulator according to the embodiment of the present disclosure.

The enable switches 81 are provided on the outer peripheral surface 80*a* of the operation unit 80, and get into a state of allowing movement of the medical device 4 by the arm 60 when the operator grasps the outer peripheral surface 80*a* of the operation unit 80 and presses the enable switches 81. As shown in FIG. 5, a pair of enable switches 81 are provided on opposite sides of the outer peripheral surface 80*a* of the operation unit 80. The enable switches 81 are provided on the opposite sides of the outer peripheral surface 80*a* of the operation unit 80 on which the switch units 83 are provided. Specifically, the cross-section of the operation unit 80 has a substantially rectangular shape, and the enable switches 81 and the switch units 83 are provided on surfaces 80b of the operation unit 80 that face each other. More specifically, the operation unit 80 has a substantially prismatic shape, and the enable switches 81 and the switch units 83 are provided on the side surfaces (the surfaces 80b along a longitudinal direction) of the substantially prismatic operation unit 80. The operator grasps the outer peripheral surface 80a of the operation unit 80 and presses at least one of the enable switches 81 provided on the opposite sides of the outer peripheral surface 80a of the operation unit 80 to allow movement of the arm 60.

The operation unit 80 according to this embodiment is configured to get into a state of allowing movement of the arm 60 when only one of the enable switches 81 provided on the opposite sides of the outer peripheral surface 80a of the operation unit 80 is pressed. Thus, it is not necessary to press both of the enable switches 81 provided on the opposite sides of the outer peripheral surface 80a of the operation unit 80, and thus the burden on the operator can be reduced while the convenience of the operator is improved.

As shown in FIG. 4, the joystick 82 is provided on an end face 80c of the operation unit 80 that intersects with the outer peripheral surface 80a. The operator can operate the joystick 82 with their finger while grasping the outer peripheral surface 80a of the operation unit 80 and pressing the enable switches 81 to allow movement of the arm 60. For example, as shown in FIG. 6, the operator operates the joystick 82 provided on the end face 80c of the operation unit 80 with their index finger, for example, while pressing the pair of enable switches 81 provided on the outer peripheral surface 80a of the operation unit 80 with their thumb and middle finger, for example. Thus, substantially constant distances between the operator's thumb and middle finger that grasp the operation unit 80 and the operator's index finger that operates the joystick 82 can be easily maintained. Which fingers are used to operate the enable switches 81 and the joystick 82 is not limited to the above example.

The joystick 82 is configured to operate movement of the medical device 4 by the arm 60 such that the tip end 4d (see FIG. 3) of the medical device 4 moves on a predetermined plane. The operation unit 80 includes the switch units 83 configured to operate movement of the medical device 4 by the arm 60 such that the tip end 4d of the medical device 4 moves along the longitudinal direction of the medical device 4 orthogonal to the predetermined plane. The predetermined plane on which the tip end 4d of the medical device 4 moves refers to a plane (an X-Y plane in FIG. 4) parallel to the end face 80c of the operation unit 80. The longitudinal direction of the medical device 4 orthogonal to the predetermined plane refers to the Z direction orthogonal to the X-Y plane in FIG. 4. Coordinates represented by an X-axis, a Y-axis, and a Z-axis in FIG. 4 are referred to as a tool coordinate system (or a base coordinate system). When the switch units 83 are pressed while the enable switches 81 are pressed (while movement of the medical device 4 by the arm 60 is allowed), the tip end 4d of the medical device 4 is moved along the longitudinal direction of the medical device 4.

Each of the switch units 83 includes a switch 83a configured to move the tip end 4d of the medical device 4 in the direction in which the medical device 4 is inserted into the patient P along the longitudinal direction of the medical device 4, and a switch 83b configured to move the tip end 4d of the medical device 4 in a direction opposite to the direction in which the medical device 4 is inserted into the patient P. Both the switch 83a and the switch 83b are push-button switches.

The switch units 83 are provided on the opposite sides of the outer peripheral surface 80a of the operation unit 80. Specifically, the switch units 83 are provided on opposite side surfaces (the surfaces 80b along the longitudinal direction) of the operation unit 80 having a substantially prismatic shape, respectively. That is, a pair of switches 83a and a pair of switches 83b are provided on both side surfaces of the operation unit 80.

When the switch units 83 are operated, the arm portion 61 is moved such that the tip end 4d of the medical device 4 is translated until the tip end 4d of the medical device 4 is moved to the vicinity of a pivot position PP (see FIG. 12), and after the tip end 4d of the medical device 4 is moved to the vicinity of the pivot position PP, the translation mechanism 70 is moved such that the tip end 4d of the medical device 4 is translated. Specifically, when the switch units 83 are operated, the arm portion 61 is moved such that the tip end 4d of the medical device 4 is translated until the tip end 4d of the medical device 4 is moved by a predetermined distance from the pivot position PP. After the tip end 4d of the medical device 4 is moved by the predetermined distance from the pivot position PP, the translation mechanism 70 is moved such that the tip end 4d of the medical device 4 is translated. That is, after the tip end 4d of the medical device 4 is moved by the predetermined distance from the pivot position PP, the arm portion 61 is not moved but only the translation mechanism 70 is moved. The pivot position PP is described below.

Figure 8:
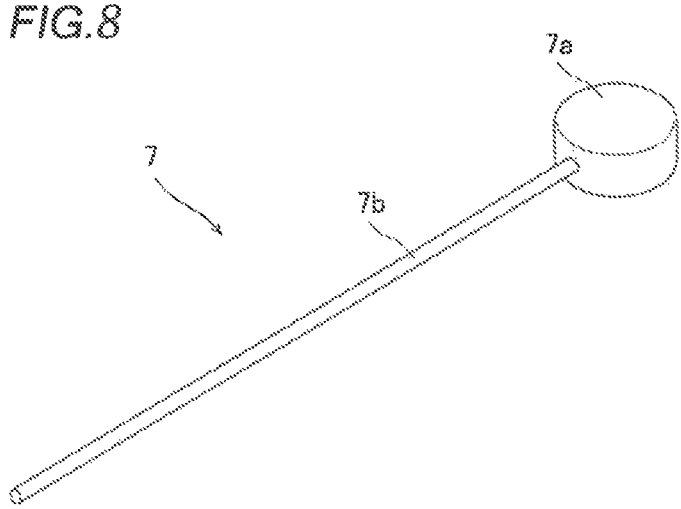
FIG. 8 is a diagram showing a pivot position teaching instrument.
Figure 9:
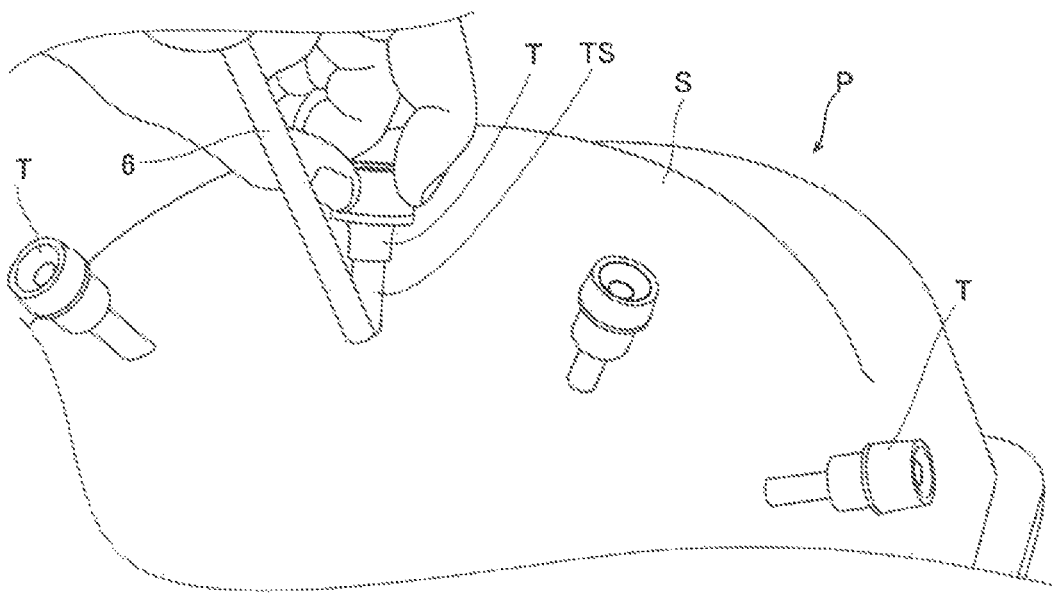
FIG. 9 is a diagram showing a state in which the tip end of the endoscope is moved to a position at which the outer surface of a trocar and the patient's body surface contact each other.

In this embodiment, as shown in FIG. 4, the operation unit 80 includes pivot buttons 85 each configured to store in the storage 32 the pivot position PP that serves as a fulcrum (see FIG. 12) for movement of the medical device 4 attached to the arm 60. The pivot buttons 85 are provided adjacent to the enable switches 81 on the surfaces 80b of the operation unit 80. As shown in FIG. 9, the pivot buttons 85 are pressed while the tip end of the endoscope 6 (see FIG. 7) as the medical device 4 attached to the tip end side of the arm 60 or a pivot position teaching instrument 7 (see FIG. 8) is moved to a position corresponding to the insertion position of the trocar T inserted into the body surface S of the patient P by the operation unit 80 such that the pivot position PP is stored in the storage 32. In the storing of the pivot position PP, the pivot position PP is set as one point (coordinates), and the direction of the medical device 4 is not set. The pivot buttons 85 are examples of a "pivot position teaching button" in the claims.

Figure 7:
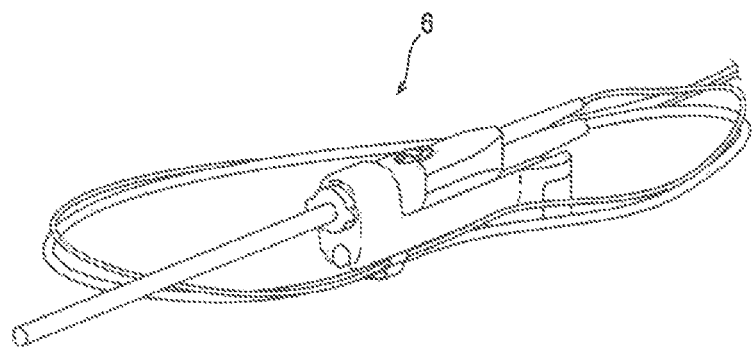
FIG. 7 is a diagram showing an endoscope.

As shown in FIG. 7, the endoscope 6 attached to the tip end side of the arm 60 when the pivot position PP is stored is an endoscope 6 actually used during surgery. On the other hand, as shown in FIG. 8, the pivot position teaching instrument 7 attached to the tip end side of the arm 60 when the pivot position PP is stored is a dummy that mimics the medical device 4 (such as a pair of forceps) actually used during surgery. The pivot position teaching instrument 7 includes a portion 7a that mimics the driven unit 4a and a portion 7b that mimics the shaft 4c. The tip end of the pivot position teaching instrument 7 (portion 7b) does not have a pointed shape.

In this embodiment, as shown in FIG. 9, the pivot buttons 85 are pressed while the tip end of the endoscope 6 or the pivot position teaching instrument 7 attached to the tip end side of the arm 60 is moved to a position at which the outer surface TS of the trocar T inserted into the body surface S of the patient P and the body surface S contact each other such that the pivot position PP is stored in the storage 32. That is, in a state in which the endoscope 6 or the pivot position teaching instrument 7 is not inserted into the trocar T but the tip end of the endoscope 6 or the pivot position teaching instrument 7 is arranged on the side of the outer surface TS of the trocar T and in the vicinity of the body surface S, the pivot position PP is stored. The term "the vicinity of the body surface S" indicates a concept including the body surface S itself and the surroundings (such as a position slightly inside the body from the body surface S) of the body surface S.

In this embodiment, the joystick 82 is operated such that the tip end of the endoscope 6 or the pivot position teaching instrument 7 attached to the tip end side of the arm 60 is moved to the position corresponding to the insertion position of the trocar T inserted into the body surface S of the patient P. Specifically, the joystick 82 and the switch units 83 are operated while the enable switches 81 are pressed such that the tip end of the endoscope 6 or the pivot position teaching instrument 7 is moved.

In this embodiment, as shown in FIG. 1, the endoscope 6 is attached to one (an arm 60b, for example) of the plurality of arms 60, and medical devices 4 other than the endoscope 6 are attached to the remaining arms 60 (arms 60a, 60c, and 60d, for example). Specifically, in surgery, the endoscope 6 is attached to one of four arms 60, and the medical devices 4 (such as pairs of forceps) other than the endoscope 6 are attached to the remaining three arms 60. The pivot position PP is stored in the storage 32 with the endoscope 6 attached to the arm 60 to which the endoscope 6 is to be attached. Furthermore, pivot positions PP are stored in the storage 32 with pivot position teaching instruments 7 attached to the arms 60 to which the medical devices 4 other than the endoscope 6 are to be attached. The endoscope 6 is attached to one of two arms 60 (the arms 60b and 60c) arranged in the center among the four arms 60 arranged adjacent to each other.

In this embodiment, as shown in FIG. 5, the pivot buttons 85 are provided on the opposite sides of the outer peripheral surface 80a of the operation unit 80. Specifically, the cross-section of the operation unit 80 has a substantially rectangular shape, and the pivot buttons 85 are provided on the surfaces 80b of the operation unit 80 that face each other, respectively. The arm 60 to which the medical device 4 other than the endoscope 6 is attached is an example of a "second arm" in the claims. The operation unit 80 provided on the arm 60 to which the medical device 4 other than the endoscope 6 is attached is an example of a "second operation unit" in the claims. The pivot buttons 85 provided on the arm 60 to which the medical device 4 other than the endoscope 6 is attached are examples of a "second pivot button" in the claims. The medical device 4 other than the endoscope 6 is an example of a "second medical device" in the claims.

Figure 10:
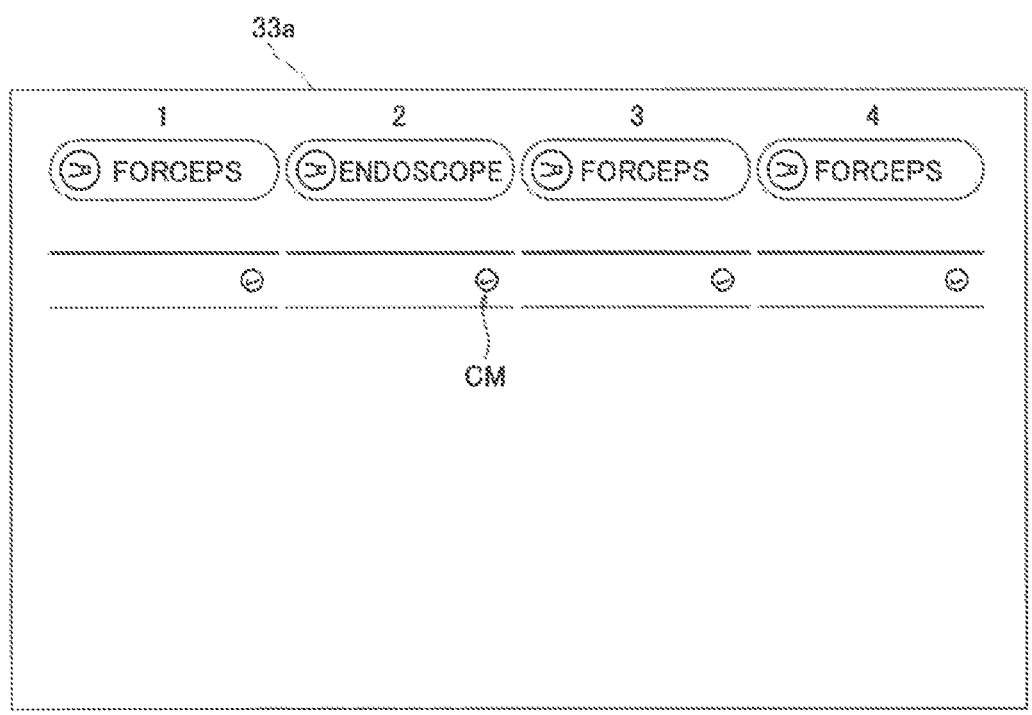
FIG. 10 is a diagram showing a display screen of a display according to the embodiment of the present disclosure.

In this embodiment, as shown in FIG. 10, a display 33a configured to display that the pivot positions PP of the plurality of arms 60 are stored is provided. The display 33a is provided on the input 33 of the medical cart 3. The display 33a includes a liquid crystal panel, for example. Numbers (1, 2, 3, and 4) corresponding to the plurality of arms 60 (60a, 60b, 60c, and 60d) are displayed on the display 33a. Furthermore, the types of medical devices 4 (such as an endoscope and a pair of forceps) respectively attached to the plurality of arms 60 are displayed on the display 33a. When the pivot position PP is stored, a check mark CM is displayed for each of the plurality of arms 60.

In this embodiment, in the medical manipulator 1, a position finely adjusted from the tip end position of the endoscope 6 or the pivot position teaching instrument 7 is stored as the pivot position PP. For example, the tip end position of the endoscope 6 or the pivot position teaching instrument 7 is a position that contacts the body surface S, and thus a position finely adjusted by a preset distance in the thickness direction of the abdominal wall is stored as the pivot position PP.

As shown in FIG. 4, adjustment buttons 86 for optimizing the position of the arm 60 are provided on the surfaces 80b of the operation unit 80. After the pivot position PP for the arm 60 to which the endoscope 6 has been attached is stored, the adjustment buttons 86 are pressed such that the positions of the other arms 60 (arm base 50) are optimized.

Figure 11:
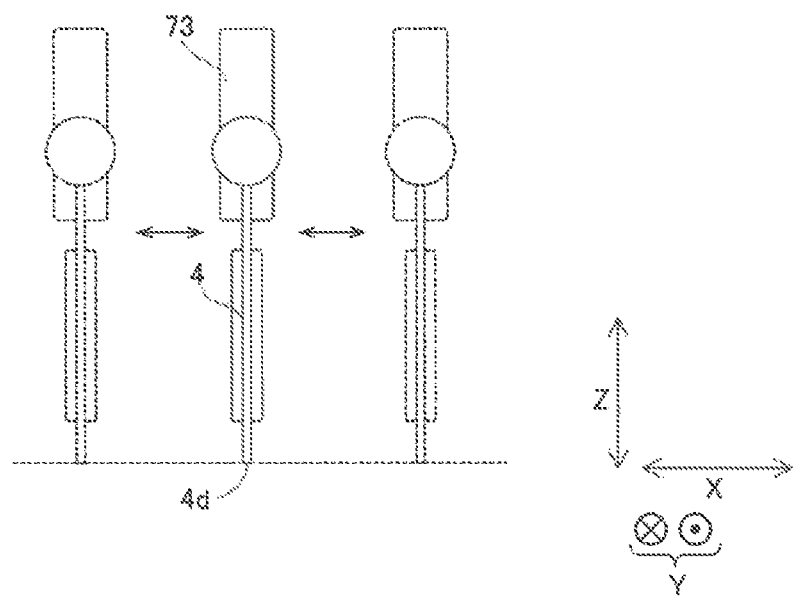
FIG. 11 is a diagram for illustrating translation of the arm.
Figure 12:
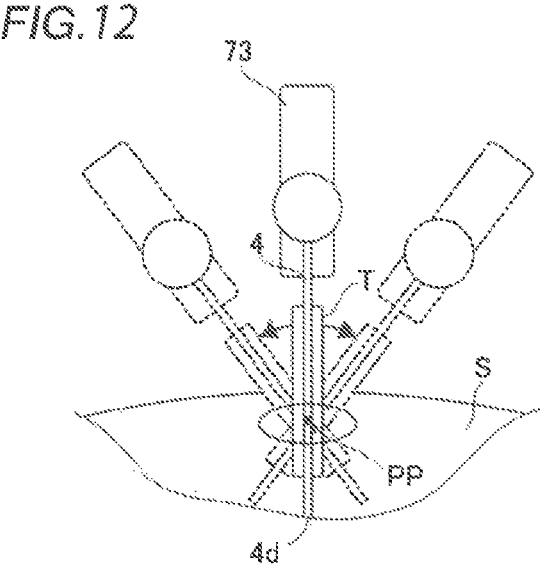
FIG. 12 is a diagram for illustrating rotation of the arm.

In this embodiment, as shown in FIG. 4, the operation unit 80 includes a mode switching button 84 configured to switch between a mode for translating the medical device 4 attached to the arm 60 (see FIG. 11) and a mode for rotating the medical device 4 (see FIG. 12). In the operation unit 80, the mode switching button 84 is arranged in the vicinity of the joystick 82. Specifically, on the end face 80c of the operation unit 80, the mode switching button 84 is provided adjacent to the joystick 82. The mode switching button 84 is a push-button switch. Furthermore, a mode indicator 84a is provided in the vicinity of the mode switching button 84. The mode indicator 84a indicates a switched mode. Specifically, the mode indicator 84a is turned on (rotation mode) or off (translation mode) such that a current mode (translation mode or rotation mode) is indicated. The mode switching button 84 is an example of a "mode switch" in the claims. The mode indicator 84a is an example of a "pivot position indicator" in the claims.

In this embodiment, the mode indicator 84a also serves as a pivot position indicator that indicates that the pivot position PP has been stored. Specifically, when the pivot position PP is stored, the mode indicator 84a continues to be turned on, and even when the mode switching button 84 is pressed, the mode indicator 84a is not turned off. Thus, the mode indicator 84a indicates that only the rotation mode is possible for the medical device 4 attached to the arm 60, and the pivot position PP is stored. The medical device 4 attached to the arm 60 to be reset is removed, and the pivot buttons 85 are pressed and held such that the pivot position PP is reset.

As shown in FIG. 11, in the mode for translating the arm 60, the arm 60 is moved such that the tip end 4d of the medical device 4 moves on the X-Y plane. As shown in FIG. 12, in the mode for rotating the arm 60, when the pivot position PP is not stored, the arm 60 is moved such that the medical device 4 rotates about the end effector 4b, and when the pivot position PP is stored, the arm 60 is moved such that the medical device 4 rotates about the pivot position PP as a fulcrum. The medical device 4 is rotated while the shaft 4c of the medical device 4 is inserted into the trocar T.

As shown in FIG. 3, the operation unit 80 is provided on the translation mechanism 70. The operation unit 80 is attached to the translation mechanism 70 so as to be adjacent to the medical device 4 attached to the translation mechanism 70. Specifically, the operation unit 80 is attached to the tip end side link 73 of the translation mechanism 70. The operation unit 80 is arranged adjacent to the driven unit 4a of the medical device 4.

Figure 13:
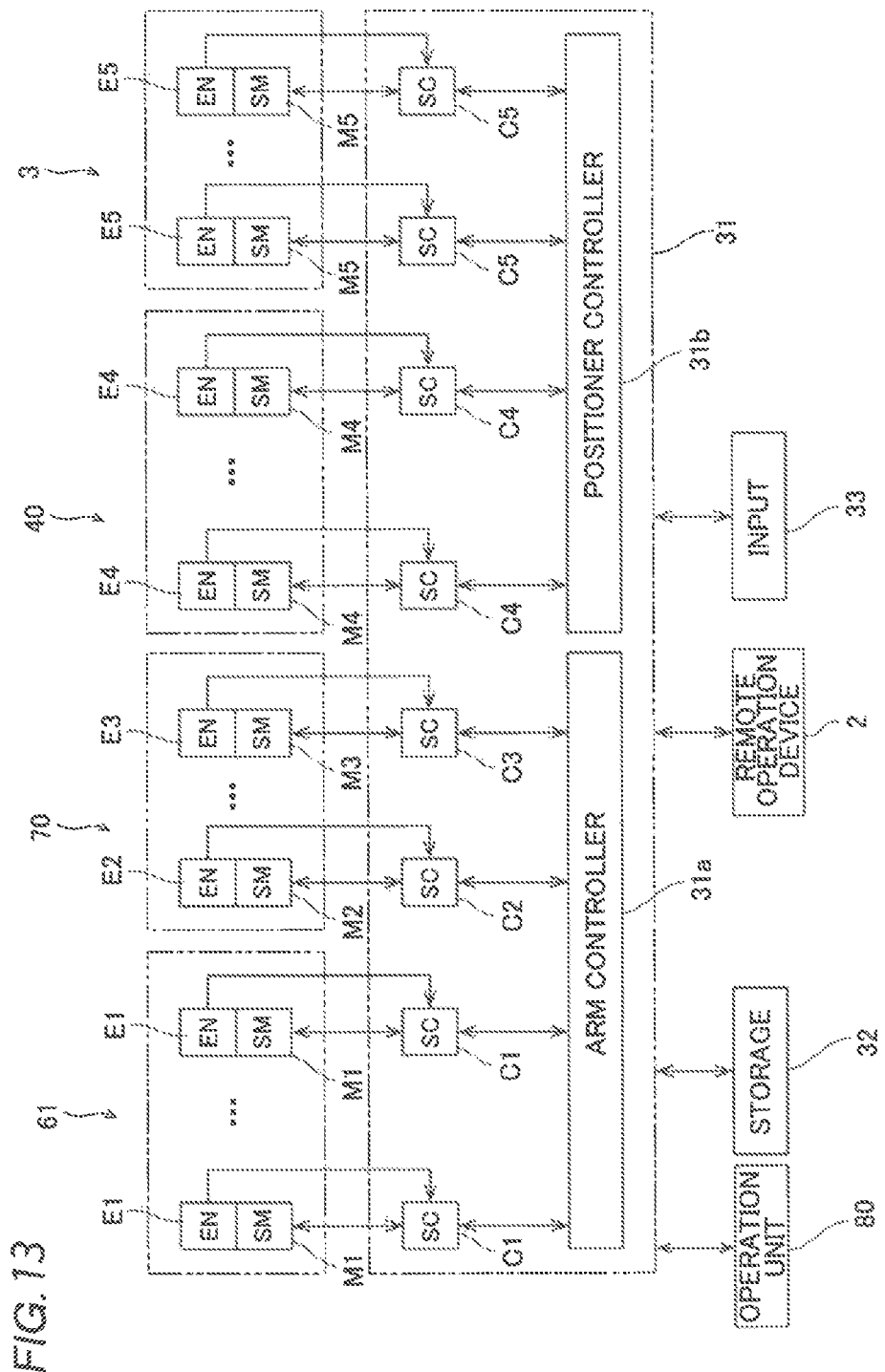
FIG. 13 is a block diagram showing the configuration of a controller of the medical manipulator according to the embodiment of the present disclosure.

As shown in FIG. 13, the arm 60 includes a plurality of servomotors M1, encoders E1, and speed reducers (not shown) so as to correspond to a plurality of joints 64 of the arm portion 61. The encoders E1 are configured to detect the rotation angles of the servomotors M1. The speed reducers are configured to slow down rotation of the servomotors M1 to increase the torques.

As shown in FIG. 13, the translation mechanism 10 includes the servomotor M2 configured to rotate the rotating body provided in the driven unit 4a of the medical device 4, the servomotor M3 configured to translate the medical device 4, encoders E2 and E3, and speed reducers (not shown). The encoders E2 and E3 are configured to detect the rotation angles of the servomotors M2 and M3, respectively. The speed reducers are configured to slow down rotation of the servomotors M2 and M3 to increase the torques.

The positioner 40 includes a plurality of servomotors M4, encoders E4, and speed reducers (not shown) so as to correspond to a plurality of joints 43 of the positioner 40. The encoders E4 are configured to detect the rotation angles of the servomotors M4. The speed reducers are configured to slow down rotation of the servomotors M4 to increase the torques.

The medical cart 3 includes servomotors M5 configured to drive a plurality of front wheels (not shown) of the medical cart 3, respectively, encoders E5, and speed reducers (not shown). The encoders E5 are configured to detect the rotation angles of the servomotors M5. The speed reducers are configured to slow down rotation of the servomotors M5 to increase the torques.

The controller 31 of the medical cart 3 includes an arm controller 31a that controls movement of the plurality of arms 60 based on commands, and a positioner controller 31b that controls movement of the positioner 40 and driving of the front wheels (not shown) of the medical cart 3 based on commands. Servo controllers C1 configured to control the servomotors M1 configured to drive the arm 60 are electrically connected to the arm controller 31a. The encoders E1 configured to detect the rotation angles of the servomotors M1 are electrically connected to the servo controllers C1.

A servo controller C2 configured to control the servomotor M2 configured to drive the medical device 4 is electrically connected to the arm controller 31a. The encoder E2 configured to detect the rotation angle of the servomotor M2 is electrically connected to the servo controller C2. A servo controller C3 configured to control the servomotor M3 configured to translate the translation mechanism 70 is electrically connected to the arm controller 31a. The encoder E3 configured to detect the rotation angle of the servomotor M3 is electrically connected to the servo controller C3.

An operation command input to the remote operation device 2 is input to the arm controller 31a. The arm controller 31a generates position commands based on the input operation command and the rotation angles detected by the encoders E1 (E2 or E3), and outputs the position commands to the servo controllers C1 (C2 or C3). The servo controllers C1 (C2 or C3) generate torque commands based on the position commands input from the arm controller 31a and the rotation angles detected by the encoders E1 (E2 or E3), and output the torque commands to the servomotors M1 (M2 or M3). Thus, the arm 60 is moved according to the operation command input to the remote operation device 2.

The controller 31 (arm controller 31a) is configured to operate the arm 60 based on an input signal from the joystick 82 of the operation unit 80. Specifically, the arm controller 31a generates position commands based on the input signal (operation command) input from the joystick 82 and the rotation angles detected by the encoders E1, and outputs the position commands to the servo controllers C1. The servo controllers C1 generate torque commands based on the position commands input from the arm controller 31a and the rotation angles detected by the encoders E1, and output the torque commands to the servomotors M1. Thus, the arm 60 is moved according to the operation command input to the joystick 82.

The controller 31 (arm controller 31a) is configured to operate the arm 60 based on an input signal from each of the switch units 83 of the operation unit 80. Specifically, the arm controller 31a generates a position command(s) based on the input signal (operation command) input from each of the switch units 83 and the rotation angle(s) detected by the encoders E1 or the encoder E3, and outputs the position command(s) to the servo controllers C1 or the servo controller C3. The servo controllers C1 or the servo controller C3 generates a torque command(s) based on the position command(s) input from the arm controller 31a and the rotation angle(s) detected by the encoders E1 or the encoder E3, and outputs the torque command(s) to the servomotors M1 or the servomotor M3. Thus, the arm 60 is moved according to the operation command input to each of the switch units 83.

The controller 31 (arm controller 31a) is configured to perform a control to reduce a change in the moving speed of the arm 60 by performing at least one of setting an upper limit for the input signal from the joystick 82 or smoothing the input signal from the joystick 82. Specifically, the controller 31 controls movement of the arm 60 using the upper limit as the input signal when the upper limit is set for the input signal from the joystick 82, and an input signal exceeding the upper limit is input. Furthermore, the controller 31 smooths the input signal from the joystick 82 by a low-pass filter (LPF), for example. In this embodiment, the controller 31 performs both of setting the upper limit for the input signal from the joystick 82 and smoothing the input signal from the joystick 82.

Specifically, the controller 31 (arm controller 31a) controls movement of the arm 60 based on an equation of motion for control shown in the following mathematical formula.

$$m\ddot{x} + c\dot{x} = F + \beta \dot{F}$$

Figure 14:
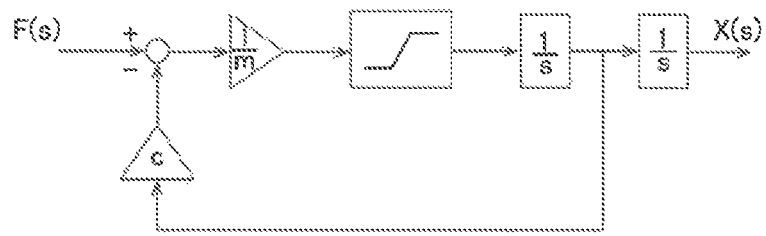
FIG. 14 is a diagram showing control blocks of the controller of the medical manipulator according to the embodiment of the present disclosure.

The controller 31 (arm controller 31a) controls movement of the arm 60 based on control blocks shown in FIG. 14. That is, the controller 31 (arm controller 31a) subtracts the product of the speed (a first order differential of x) and the viscosity coefficient c from the input signal F(s) from the joystick 82. Then, the subtracted value is multiplied by an inertia coefficient 1/m. When the multiplied value ($=1/m(F(s)-c \times speed)$=acceleration=second order differential of x) exceeds the upper limit, the acceleration is set to the upper limit. Then, the acceleration is integrated to calculate the speed (the first order differential of x), and the speed is integrated to calculate a position X(s).

As shown in FIG. 13, servo controllers C4 configured to control the servomotors M4 that move the positioner 40 are electrically connected to the positioner controller 31b. The encoders E4 configured to detect the rotation angles of the servomotors M4 are electrically connected to the servo controllers C4. Servo controllers C5 configured to control the servomotors M5 that drive the front wheels (not shown) of the medical cart 3 are electrically connected to the positioner controller 31b. The encoders E5 configured to detect the rotation angles of the servomotors M5 are electrically connected to the servo controllers C5.

An operation command regarding preparation position setting, for example, is input from the input 33 to the positioner controller 31b. The positioner controller 31b generates position commands based on the operation command input from the input 33 and the rotation angles detected by the encoders E4, and outputs the position commands to the servo controllers C4. The servo controllers C4 generate torque commands based on the position commands input from the positioner controller 31*b* and the rotation angles detected by the encoders E4, and output the torque commands to the servomotors M4. Thus, the positioner 40 is moved according to the operation command input to the input 33. Similarly, the positioner controller 31*b* moves the medical cart 3 based on an operation command from the input 33.

A method for setting the pivot position by the medical manipulator 1 (a method for storing the pivot position for the medical manipulator 1) is now described. The endoscope 6 is attached to one of the plurality of (four) arms 60, and the pivot position teaching instruments 7 are attached to the other arms 60. On the display 33*a*, "ENDOSCOPE" is displayed below a number (number 2 in FIG. 10) corresponding to the arm 60 to which the endoscope 6 has been attached, and "FORCEPS" is displayed below numbers (numbers 1, 3, and 4 in FIG. 10) corresponding to the arms 60 to which the medical devices 4 (forceps, for example) other than the endoscope 6 have been attached. The trocars T are inserted into the body surface S of the patient P.

Figure 15:
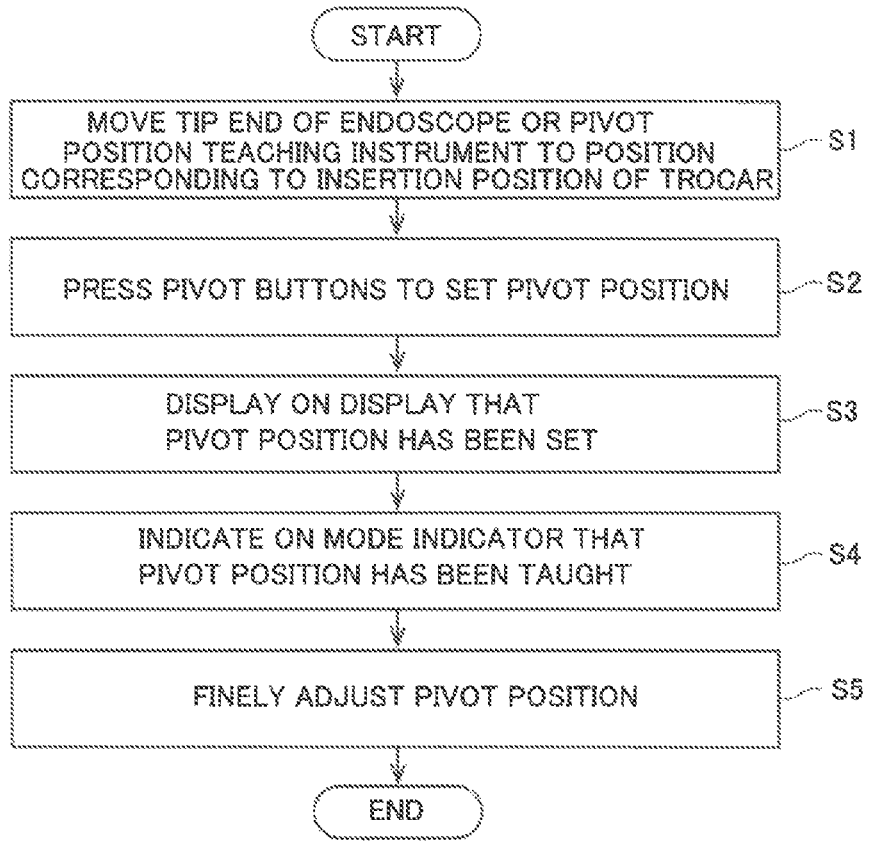
FIG. 15 is a flowchart for illustrating a method for setting a pivot position according to the embodiment of the present disclosure.

First, in step S1 (see FIG. 15), as shown in FIG. 9, the tip end of the endoscope 6 or the pivot position teaching instrument 7 as the medical device 4 attached to the tip end side of the arm 60 is moved to the position corresponding to the insertion position of the trocar T inserted into the body surface S of the patient P by the operation unit 80. Specifically, first, the arm 60 to which the endoscope 6 has been attached is operated such that the tip end of the endoscope 6 is moved to the position corresponding to the insertion position of the trocar T inserted into the body surface S of the patient P. More specifically, the tip end of the endoscope 6 is moved to the position at which the outer surface TS of the trocar T inserted into the body surface S of the patient P and the body surface S contact each other.

Next, in step S2 (see FIG. 15), the pivot buttons 85 are pressed with the tip end of the endoscope 6 moved to the position corresponding to the insertion position of the trocar T (the pivot position PP is stored in the storage 32). That is, the pivot buttons 85 provided on the arm 60 are pressed such that the instruction to store the pivot position PP is executed. Thus, the medical manipulator 1 stores the pivot position PP that serves as a fulcrum for movement of the endoscope 6 attached to the arm 60. The position finely adjusted by the preset distance in the thickness direction of the abdominal wall with respect to the position of the tip end of the endoscope 6 moved to the position corresponding to the insertion position of the trocar T is stored as the pivot position PP.

Next, in step S3 (see FIG. 15), the medical manipulator 1 displays on the display 33*a* that the pivot position PP of the arm 60 has been stored. Specifically, the check mark CM is displayed below the number (number 2 in FIG. 10) corresponding to the arm 60 to which the endoscope 6 has been attached.

Next, in step S4 (see FIG. 15), the medical manipulator 1 indicates on the mode indicator 84*a* of the operation unit 80 that the pivot position PP has been stored. Specifically, the mode indicator 84*a* of the operation unit 80 attached to the arm 60 to which the endoscope 6 has been attached is turned on. The order of step S3 and step S4 may be transposed.

In this manner, in this embodiment, first, the medical manipulator 1 stores the pivot position PP for one arm 60 to which the endoscope 6 has been attached among the plurality of arms 60. Then, step S1 to step S5 described above are repeated such that the medical manipulator 1 sequentially stores the pivot positions PP for the remaining arms 60 to which the pivot position teaching instruments 7 have been attached among the plurality of arms 60.

The procedure of surgery using the medical manipulator 1 is now described. In the surgery using the medical manipulator 1, the medical cart 3 is first moved to a predetermined position in the operating room by the operator. Next, the operator operates a touch panel of the input 33 to operate the positioner 40 such that the arm base 50 and a surgical table 5 or the patient P have a desired positional relationship, and moves the arm base 50. Furthermore, the arm 60 is moved such that the trocar T (a working channel for inserting a surgical instrument or the like into the body cavity) arranged on the body surface of the patient P and the medical device 4 have a predetermined positional relationship. The joysticks 82 and the switch units 83 are operated by the operator such that the plurality of arms 60 are moved to desired positions. Then, the pivot positions PP are stored (taught) as described above. Then, with the positioner 40 being stationary, the plurality of arms 60 and the medical devices 4 are operated based on commands from the remote operation device 2. Thus, the surgery with the medical manipulator 1 is performed.

Advantages of This Embodiment

According to this embodiment, the following advantages are achieved.

Advantages of Surgical Robot

According to this embodiment, as described above, in the medical manipulator 1, the pivot buttons 85 are pressed with the tip end of the medical device 4 (the endoscope 6 or the pivot position teaching instrument 7) attached to the tip end side of the arm 60 moved to the position corresponding to the insertion position of the trocar T inserted into the body surface S of the patient P by the operation unit 80 such that the pivot position PP is stored in the storage 32. Accordingly, the pivot buttons 85 are pressed such that the pivot position PP is stored in the storage 32, and thus it is not necessary to arrange an instrument or the like that supports the trocar T in order to store (set) the pivot position PP. Consequently, the operation in the vicinity of the body surface S of the patient P with the plurality of trocars T being arranged thereon can be easily performed as compared with a case in which the pivot position PP is mechanically determined.

According to this embodiment, as described above, in the medical manipulator 1, the pivot buttons 85 are pressed in a state where the tip end of the endoscope 6 or the pivot position teaching instrument 7 attached to the tip end side of the arm 60 is moved, by the operation unit 80, to the position at which the outer surface TS of the trocar T inserted into the body surface S of the patient P and the body surface S contact each other such that the pivot position PP is stored in the storage 32. Accordingly, unlike a case in which the pivot position PP is stored in a state in which the tip end of the endoscope 6 or the pivot position teaching instrument 7 is arranged inside the trocar T, the tip end of the endoscope 6 or the pivot position teaching instrument 7 can be visually recognized when the pivot position PP is stored, and thus the pivot position PP can be appropriately stored.

According to this embodiment, as described above, the plurality of arms 60 are provided, the endoscope 6 is attached to one of the plurality of arms 60, the medical device 4 other than the endoscope 6 is attached to at least one of the remaining arms 60, and in the medical manipulator 1, the pivot position PP is stored in the storage 32 with the endoscope 6 being attached to the arm 60 to which the endoscope 6 is to be attached, and the pivot position PP is stored in the storage 32 with the pivot position teaching instrument 7 being attached to the arm 60 to which the medical device 4 other than the endoscope 6 is to be attached. Accordingly, the pivot position PP is stored according to the type of medical device 4 actually attached to the arm 60, and thus the pivot position PP can be appropriately stored.

According to this embodiment, as described above, the medical manipulator 1 includes the arm base 50 configured to support the plurality of arms 60, and the positioner 40 configured to move the arm base 50. Accordingly, the positioner 40 can collectively move the plurality of arms 60 attached to the arm base 50 to desired positions, and thus a control to move the plurality of arms 60 can be easily performed.

According to this embodiment, as described above, the medical manipulator 1 includes the display 33a configured to display that the pivot positions PP of the plurality of arms 60 have been stored in the storage 32. Accordingly, the operator can easily confirm whether or not the pivot positions PP have been stored for the plurality of arms 60 by visually recognizing the display 33a.

According to this embodiment, as described above, the pivot buttons 85 are provided on the opposite sides of the outer peripheral surface 80a of the operation unit 80. Accordingly, unlike a case in which the pivot button 85 is provided on only one side of the outer peripheral surface 80a of the operation unit 80, the convenience of operation of the pivot buttons 85 can be improved.

According to this embodiment, as described above, the operation unit 80 includes the mode indicator 84a configured to indicate that the pivot position PP has been stored in the storage 32. Accordingly, the operator can easily confirm whether or not the pivot position PP has been stored in the storage 32 for the arm 60 by visually recognizing the mode indicator 84a. Furthermore, the mode indicator 84a is provided on the operation unit 80, and thus the operator can confirm whether or not the pivot position PP has been stored in the storage 32 for the arm 60 while operating the operation unit 80.

According to this embodiment, as described above, the operation unit 80 includes the mode switching button 84 configured to switch between the mode for translating the medical device 4 attached to the arm 60 and the mode for rotating the medical device 4 attached to the arm 60, and the mode indicator 84a configured to indicate the switched mode, and the mode indicator 84a also serves as the pivot position indicator configured to indicate that the pivot position PP has been stored in the storage 32. Accordingly, unlike a case in which the mode indicator 84a and the pivot position indicator configured to indicate that the pivot position PP has been stored in the storage 32 are provided separately, the configuration of the medical manipulator 1 can be simplified.

According to this embodiment, as described above, the operation unit 80 includes the joystick 82 configured to operate movement of the medical device 4 by the arm 60, and the joystick 82 is operated such that the tip end of the medical device 4 (the endoscope 6 or the pivot position teaching instrument 7) attached to the tip end side of the arm 60 is moved to the position corresponding to the insertion position of the trocar T inserted into the body surface S of the patient P. Accordingly, the operator can easily move the endoscope 6 or the pivot position teaching instrument 7 using the joystick 82.

According to this embodiment, as described above, in the medical manipulator 1, the position finely adjusted by the preset distance in the thickness direction of the abdominal wall with respect to the tip end position of the medical device 4 that contacts the body surface S of the patient P is stored in the storage 32 as the pivot position PP. Accordingly, the pivot position PP can be appropriately set in the abdominal wall of the patient P.

Advantages of Method for Setting Pivot Position

According to this embodiment, as described above, the method for setting the pivot position includes storing the pivot position PP that serves as a fulcrum for movement of the medical device 4 attached to the arm 60 by the medical manipulator 1 by pressing the pivot buttons 85 (receiving the instruction to store the pivot position PP) with the tip end of the endoscope 6 or the pivot position teaching instrument 1 moved to the position corresponding to the insertion position of the trocar T. Accordingly, the pivot buttons 85 are pressed such that the pivot position PP is stored in the storage 32, and thus it is not necessary to arrange an instrument or the like that supports the trocar T in order to teach (store) the pivot position PP. Consequently, the operation in the vicinity of the body surface S of the patient P with the plurality of trocars T being arranged thereon can be easily performed as compared with a case in which the pivot position PP is mechanically determined.

According to this embodiment, as described above, the storing of the pivot position PP includes storing the pivot position PP by the medical manipulator 1 by pressing the pivot buttons 85 with the tip end of the endoscope 6 or the pivot position teaching instrument 7 attached to the tip end side of the arm 60 moved to the position at which the outer surface TS of the trocar T inserted into the body surface S of the patient P and the body surface S contact each other. Accordingly, unlike a case in which the pivot position PP is stored in the storage 32 in a state in which the tip end of the endoscope 6 or the pivot position teaching instrument 7 is arranged inside the trocar T, the tip end of the endoscope 6 or the pivot position teaching instrument 7 can be visually recognized when the pivot position PP is stored, and thus the pivot position PP can be appropriately stored in the storage 32.

According to this embodiment, as described above, the storing of the pivot position PP includes first storing the pivot position PP by the medical manipulator 1 for one arm 60 to which the endoscope 6 has been attached among the plurality of arms 60 and then storing the pivot position PP by the medical manipulator 1 for the remaining arm 60 to which the medical device 4 (pivot position teaching instrument 7) other than the endoscope 6 has been attached as the medical device 4 among the plurality of arms 60. Accordingly, the pivot position PP for the pivot position teaching instrument 7 attached later can be stored with reference to the endoscope 6 first attached to the arm 60, and thus the relative positional relationship between the pivot position PP of the endoscope 6 and the pivot position PP of the pivot position teaching instrument 7 (medical device 4) can be appropriately stored.

According to this embodiment, as described above, the method for setting the pivot position includes displaying, by the medical manipulator 1, on the display 33a that the pivot positions PP of the plurality of arms 60 have been stored. Accordingly, the operator can easily confirm whether or not the pivot positions PP have been stored for the plurality of arms 60 by visually recognizing the display 33a.

According to this embodiment, as described above, the method for setting the pivot position includes indicating, by the medical manipulator 1, on the mode indicator 84a of the operation unit 80 that the pivot position PP has been stored. Accordingly, the operator can easily confirm whether or not the pivot position PP has been stored for the arm 60 by visually recognizing the mode indicator 84a. Furthermore, the mode indicator 84a is provided on the operation unit 80, and thus the operator can confirm whether or not the pivot position PP has been stored in the storage 32 for the arm 60 while operating the operation unit 80.

According to this embodiment, as described above, the pivot buttons 85 provided on the arm 60 are pressed such that the instruction to store in the storage 32 the pivot position PP is executed. Accordingly, the pivot buttons 85 are pressed such that the pivot position PP can be easily stored in the storage 32.

Modified Examples

The embodiment disclosed this time must be considered as illustrative in all points and not restrictive. The scope of the present disclosure is not shown by the above description of the embodiment but by the scope of claims for patent, and all modifications (modified examples) within the meaning and scope equivalent to the scope of claims for patent are further included.

For example, while one of the pair of enable switches 81 provided on the opposite sides of the outer peripheral surface 80a of the operation unit 80 is pressed such that movement of the arm 60 is allowed in the aforementioned embodiment, the present disclosure is not limited to this. For example, both of the pair of enable switches 81 provided on the opposite sides of the outer peripheral surface 80a of the operation unit 80 may alternatively be pressed such that movement of the arm 60 is allowed.

While the pair of enable switches 81, the pair of switch units 83, and the pair of pivot buttons 85 are provided on the opposite sides of the outer peripheral surface 80a of the operation unit 80 in the aforementioned embodiment, the present disclosure is not limited to this. For example, one enable switch 81, one switch unit 83, and one pivot button 85 may alternatively be provided on one side of the outer peripheral surface 80a of the operation unit 80.

While the operation unit 80 is attached to the translation mechanism 70 in the aforementioned embodiment, the present disclosure is not limited to this. For example, the operation unit 80 may alternatively be attached to the arm portion 61.

While the joystick 82 is configured to operate movement of the arm 60 in the plane in the aforementioned embodiment, the present disclosure is not limited to this. For example, the joystick 82 may alternatively be configured to be able to operate movement of the arm 60 along an axis orthogonal to the plane in addition to operating movement of the arm 60 in the plane.

While after the tip end 4d of the medical device 4 is moved by the predetermined distance from the pivot position PP, the translation mechanism 70 is moved such that the tip end 4d of the medical device 4 is translated in the aforementioned embodiment, the present disclosure is not limited to this. For example, after the tip end 4d of the medical device 4 reaches the pivot position PP, the translation mechanism 70 may alternatively be moved such that the tip end 4d of the medical device 4 is translated.

While the controller 31 performs both of setting the upper limit for the input signal from the joystick 82 and smoothing the input signal from the joystick 82 in the aforementioned embodiment, the present disclosure is not limited to this. For example, the controller 31 may alternatively perform only one of setting the upper limit for the input signal from the joystick 82 and smoothing the input signal from the joystick 82.

While the pivot position PP is stored in the storage 32 with the tip end of the endoscope 6 or the pivot position teaching instrument 7 moved to the position at which the outer surface TS of the trocar T and the body surface S contact each other in the aforementioned embodiment, the present disclosure is not limited to this. For example, the pivot position PP may alternatively be stored with the tip end of the endoscope 6 or the pivot position teaching instrument 7 being inserted into the trocar T.

While the four arms 60 are provided in the aforementioned embodiment, the present disclosure is not limited to this. The number of arms 60 may alternatively be three.

While each of the arm portion 61 and the positioner 40 includes a 7-axis articulated robot in the aforementioned embodiment, the present disclosure is not limited to this. For example, each of the arm 60 and the positioner 40 may alternatively include an articulated robot having an axis configuration (six axes or eight axes, for example) other than the 7-axis articulated robot.

While the display 33a and the mode indicator 84a respectively displays and indicates that the pivot position PP has been stored in the storage 32 in the aforementioned embodiment, the present disclosure is not limited to this. For example, only one of the display 33a and the mode indicator 84a may alternatively display or indicate that the pivot position PP has been stored in the storage 32.

While the mode indicator 84a also serves as the pivot position indicator configured to indicate that the pivot position PP has been stored in the storage 32 in the aforementioned embodiment, the present disclosure is not limited to this. For example, the mode indicator 84a and the pivot position indicator configured to indicate that the pivot position PP has been stored in the storage 32 may alternatively be provided separately from each other.

While the position finely adjusted with respect to the tip end position of the endoscope 6 or the pivot position teaching instrument 1 is stored as the pivot position PP in the aforementioned embodiment, the present disclosure is not limited to this. In the present disclosure, the tip end position of the endoscope 6 or the pivot position teaching instrument 7 that is not finely adjusted may alternatively be stored in the storage 32 as the pivot position PP.

While the pivot position PP is stored in the storage 32 using the pivot position teaching instrument 7 in the aforementioned embodiment, the present disclosure is not limited to this. In the present disclosure, instead of the pivot position teaching instrument 7, a pair of forceps actually used may alternatively be used to store in the storage 32 the pivot position PP.

What is claimed is:

1. A surgical robot comprising:
   an arm having a tip end side to which a medical device is attached;
   an operation unit attached to the arm, the operation unit being configured to operate the arm; and
   a storage, wherein
   the operation unit includes an operation tool configured to control the arm, the operation tool comprising: at least one of a joystick and a switch unit; an enable switch; and a pivot position teaching button configured to store in the storage a pivot position comprising an insertion position on a body surface of a patient for insertion of a trocar, the pivot position functioning as a fulcrum for movement of the medical device attached to the arm;

the at least one of the joystick and the switch unit, the enable switch, and the pivot position teaching button of the operation tool are arranged on the operation unit apart from each other within a range that facilitates operation by fingers of one hand of an operator gripping the operation unit, the pivot position teaching button is pressed in response to a tip end of the medical device attached to the tip end side of the arm being moved by operation of the at least one of the joystick and the switch unit, to a position corresponding to the insertion position into which the trocar is inserted into the body surface of a patient by the operation unit such that the pivot position is stored in the storage, and the joystick and the switch unit are operated while the enable switch is operated.

2. The surgical robot according to claim 1, wherein the pivot position teaching button is pressed in a state in which the tip end of the medical device attached to the tip end side of the arm is moved, by the operation unit, to a position at which an outer surface of the trocar inserted into the body surface of the patient and the body surface contact each other such that the pivot position is stored in the storage.

3. The surgical robot according to claim 1, further comprising:
a second arm having a tip end side to which a second medical device is attached; and
a second operation unit attached to the second arm and including a second pivot position teaching button, wherein
the medical device attached to the arm is an endoscope, and the second medical device is other than the endoscope; and
the pivot position is stored with the endoscope being attached to the arm to which the endoscope is to be attached, and a second pivot position is stored in the storage by the second pivot position teaching button with a pivot position teaching instrument or a medical device other than the endoscope being attached to the second arm to which the medical device other than the endoscope is to be attached.

4. The surgical robot according to claim 3, further comprising:
an arm base configured to support the arm and the second arm; and
an arm base mover configured to move the arm base.

5. The surgical robot according to claim 3, further comprising:
a display configured to display that the pivot position of the arm and the second pivot position of the second arm have been stored.

6. The surgical robot according to claim 1, wherein the pivot position teaching button is provided on each of opposite sides of an outer peripheral surface of the operation unit.

7. The surgical robot according to claim 1, wherein the operation unit further includes a pivot position indicator configured to indicate that the pivot position has been stored.

8. The surgical robot according to claim 7, wherein
the operation unit further includes a mode switch configured to switch between a mode for translating the medical device attached to the arm and a mode for rotating the medical device attached to the arm, and a mode indicator configured to indicate a switched mode; and the mode indicator also serves as the pivot position indicator configured to indicate that the pivot position has been stored.

9. The surgical robot according to claim 1, wherein
the joystick is configured to operate movement of the medical device by the arm; and
the joystick is operated such that the tip end of the medical device attached to the tip end side of the arm is moved to the position corresponding to the insertion position of the trocar inserted into the body surface of the patient.

10. The surgical robot according to claim 1, wherein the pivot position teaching button is pressed such that a position finely adjusted from a position of the tip end of the medical device is stored as the pivot position.

11. The surgical robot according to claim 1, wherein the arm includes no mechanism configured to hold the trocar.

12. A method for setting a pivot position, the method comprising:
moving a tip end of a medical device attached to a tip end side of an arm to a pivot position corresponding to an insertion position of a trocar inserted into a body surface of a patient by operating the arm, the pivot position functioning as a fulcrum for movement of the medical device attached to the arm; and
storing in a storage the pivot position by pressing a pivot position teaching button in response to the tip end of the medical device being moved to the pivot position corresponding to the insertion position of the trocar, wherein
moving the tip end comprises moving the arm by an operation tool comprising: at least one of a joystick and a switch unit; an enable switch; and the pivot position teaching button,
the at least one of the joystick and the switch unit, the enable switch, and the pivot position teaching button of the operation tool are arranged on an operation unit apart from each other within a range to facilitate operation by fingers of one hand of an operator gripping the operation unit,
the pivot position teaching button is pressed in response to the tip end being moved by operation of the at least one of the joystick and the switch unit, to the position corresponding to the insertion position of the trocar, and
the joystick and the switch unit are operated while the enable switch is operated.

13. The method for setting the pivot position according to claim 12, wherein the storing of the pivot position includes first storing the pivot position for the arm to which an endoscope has been attached as the medical device and then storing in the storage a second pivot position for a second arm to which a medical device other than the endoscope has been attached.

14. The method for setting the pivot position according to claim 13, further comprising:
displaying on a display that the pivot position of the arm and the second pivot position of the second arm have been stored.

15. The method for setting the pivot position according to claim 12, further comprising:
indicating on a pivot position indicator of an operation unit that the pivot position has been stored.

16. The method for setting the pivot position according to claim 12, wherein the pivot position teaching button is pressed such that a position finely adjusted from a position of the tip end of the medical device is stored as the pivot position.

17. A method for setting a pivot position, the method comprising:
    moving a tip end of a medical device attached to a tip end side of an arm to a pivot position at which an outer surface of a trocar inserted into a body surface of a patient and the body surface contact each other by operating the arm, the pivot position functioning as a fulcrum for movement of the medical device attached to the arm; and
    storing in a storage the pivot position by receiving an instruction to store the pivot position in response to the tip end of the medical device being moved to the pivot position at which the outer surface of the trocar inserted into the body surface of the patient and the body surface contact each other, wherein
    moving the tip end comprises moving the arm by an operation tool comprising: at least one of a joystick and a switch unit; an enable switch; and the pivot position teaching button,
    the at least one of the joystick and the switch unit, the enable switch, and the pivot position teaching button of the operation tool are arranged on an operation unit apart from each other within a range to facilitate operation by fingers of one hand of an operator gripping the operation unit,
    the pivot position teaching button is pressed in response to the tip end being moved by operation of the at least one of the joystick and the switch unit, to the position corresponding to the insertion position of the trocar, and
    the joystick and the switch unit are operated while the enable switch is operated.

18. The method for setting the pivot position according to claim 17, wherein the medical device used to store the pivot position is an endoscope, a pair of forceps, or a pivot position teaching instrument.

19. The method for setting the pivot position according to claim 17, wherein the arm includes no mechanism configured to hold the trocar.

20. The method for setting the pivot position according to claim 17, wherein a pivot position teaching button provided on the arm is pressed such that the instruction to store the pivot position in the storage is executed.

21. A surgical robot comprising:
    an arm having a tip end side to which a medical device is attached;
    an operation unit attached to the arm, the operation unit being configured to operate the arm; and
    a storage, wherein
    the operation unit includes an operation tool configured to control the arm, the operation tool comprising: at least one of a joystick and a switch unit; an enable switch; and a pivot position teaching button configured to store in the storage a pivot position comprising an insertion point for a trocar into which the medial device is inserted into a body surface of a patient by the operation unit, the pivot position functioning as a fulcrum for movement of the medical device attached to the arm inserted into the trocar;
    the at least one of the joystick and the switch unit, the enable switch and the pivot position teaching button of the operation tool are arranged on the operation unit apart from each other within a range that facilitates operation by fingers of one hand of an operator gripping the operation unit,
    the pivot position teaching button is pressed in response to a tip end of the medical device attached to the tip end side of the arm being moved by operation of the at least one of the joystick and the switch unit, to the insertion point such that the pivot position is stored in the storage, and
    the joystick and the switch unit are operated while the enable switch is operated.

22. The surgical robot according to claim 1, wherein the operation tool comprises the joystick.

23. The surgical robot according to claim 1, wherein the operation tool comprises the switch unit.

24. The surgical robot according to claim 1, wherein the operation tool comprises one or more of: the joystick; and the switch unit.

* * * * *